United States Patent [19]

Lehmann et al.

[11] Patent Number: 4,571,346

[45] Date of Patent: Feb. 18, 1986

[54] METHOD FOR PRODUCING COLD-WATER SOLUBLE GELATIN DESSERT MIXES AND PRODUCTS THEREFROM

[75] Inventors: Douglas M. Lehmann, Howell; Gordon F. Kunz, Windsor; Paul A. Kirkpatrick, Jackson; Nancy A. Swallow, Plainsboro; Richard R. Leshik, Eging Township, Mercer County; Marvin Schulman, Howell, all of N.J.

[73] Assignee: General Foods Corporation, White Plains, N.Y.

[21] Appl. No.: 636,537

[22] Filed: Aug. 1, 1984

[51] Int. Cl.⁴ ................................................. A23L 1/04
[52] U.S. Cl. ..................................... 426/576; 426/453
[58] Field of Search ................ 426/576, 453, 443, 465

[56] References Cited

U.S. PATENT DOCUMENTS

| | | | |
|---|---|---|---|
| 3,143,428 | 8/1964 | Reimers et al. | 426/453 |
| 3,927,221 | 12/1975 | Kalafatas | 426/576 |
| 3,930,052 | 12/1975 | De Brou et al. | 426/576 |
| 4,073,951 | 2/1978 | Sargeant | 426/453 |

Primary Examiner—Jeanette M. Hunter
Attorney, Agent, or Firm—Thomas R. Savoie; Barbara T. D'Avanzo; Daniel J. Donovan

[57] ABSTRACT

A method for agglomerating a low-moisture, amorphous gelatin-containing mix wherein finely ground gelatin is combined with a ground, anhydrous food acid and ground sugar and/or polydextrose and the mix is heated, while being agitated to a temperature between 180° and 200° F.

8 Claims, No Drawings

METHOD FOR PRODUCING COLD-WATER SOLUBLE GELATIN DESSERT MIXES AND PRODUCTS THEREFROM

BACKGROUND OF THE INVENTION

1. Technical Field

The present invention relates to a method for producing an amorphous gelatin-containing agglomerate which is useful as a gelatin dessert mix per se or as a component in a gelatin dessert mix. The products produced in accordance with this invention are readily soluble and dispersible in water as cold as 40° F.

The art has long recognized the need for cold-water soluble gelatin products as there is a growing demand for all categories of food products which can be fully prepared and ready for consumption in the shortest period of time. The vast majority of gelatin dessert mixes which are currently available require the use of hot water to dissolve the gelatin and extended times, on the order of from about 3 to about 4 hours, to permit them to achieve the proper consistency for eating. Thus, these products are often viewed as inconvenient because they require the use of hot water and also because of the extended setting time before they can be enjoyed. Because of this, many consumers who enjoy eating gelatin desserts and salads forego their use because they perceive them as too inconvenient.

2. Background Art

Various prior art disclosures are directed to the production of cold-water soluble gelatin and cold-water soluble gelatin dessert mixes; however, none of these prior art inventions have had a significant effect in the marketplace. It has been known for some time, as exemplified by U.S. Pat. No. 2,819,970 to Steigmann, that a gelatin material which is soluble in cold water may be prepared by drying (e.g. spray drying, drum drying, or freeze drying) an aqueous gelatin solution in a manner which preserves the gelatin in a molecularly dispersed amorphous form rather than the usual crystalline form. Use of amorphous gelatin material has, however, led to problems of clumping, poor dispersibility and/or foaming when the gelatin particles are mixed with cold water via simple mixing techniques such as stirring with a spoon or fork. In addition prior amorphous gelatin-containing dessert mixes were found not to be easily dispersible and soluble in water under 60° F.

In an effort to overcome some of the problems associated with the use of amorphous gelatin per se as an ingredient in powdered gelatin dessert mixes the prior art has co-dried gelatin-sugar solutions. Examples of this approach are disclosed in U.S. Pat. No. 2,803,548 to Hagerty, U.S. Pat. No. 2,841,498 to Cahn et al, U.S. Pat. No. 3,362,830 to Addesso, U.S. Pat. No. 4,401,685 to Brown et al, U.S. Pat. No. 4,407,836 to Bosco et al, and U.S. Pat. No. 4,409,255 to Danielson et al. This approach however greatly increases the drying costs, produces a gelatin composition which is not suitable for use in sugar-free products, and does not produce a gelatin material composition which is soluble and/or dispersible in water as low as 50° F.

The functionality of amorphous gelatin per se has been sought to be improved via various additive, grinding or dry-blending techniques. These approaches being set forth in U.S. Pat. No. 2,819,971 to Gunthardt, U.S. Pat. No. 3,595,675 to Ash et al and U.S. Pat. No. 3,930,052 to De Brou et al. None of the techniques has however permitted the production of a powdered cold-water soluble gelatin-dessert composition which can be readily dispersed and dissolved in water as low as even 50° F.

Agglomeration is, of course, well-known in the art. Fluidized bed agglomeration procedures, such as disclosed in U.S. Pat. No. 3,251,695 to Gidlow, U.S. Pat. No. 3,433,644 to Ganske and U.S. Pat. No. 2,856,290 to Peebles, are well-known in the art. These patents rely on an aqueous agglomeration vehicle which is sprayed into the fluidized bed in order to induce agglomeration. After sufficient agglomeration has been effected, significant amounts of heat must be supplied to the agglomerates to drive off exogenous moisture. Such procedures as using added moisture and high temperatures possess certain disadvantages such as exposing water-sensitive ingredients to moisture, exposing heat-sensitive ingredients to elevated temperatures and increased energy costs for having to first add then remove moisture.

The use of elevated temperatures to form a fused mass or sheet from an aspartame and acid-containing dry blend is disclosed in U.S. Pat. No. 3,928,633 to Shoaf et al. According to this patent a citric acid melt is formed and this melt is subsequently cooled and ground.

The use of the water of crystallization in crystalline hydrates such as citric acid monohydrate which is released upon heating to effect a limited amount of agglomeration is disclosed in U.S. Pat. No. 3,920,854 to Wuhrmann et al.

The prior art does not, however, disclose the use of agglomeration in connection with the production of amorphous gelatin-containing products. A possible reason for this omission would be that it is well-known that amorphous gelatin will upon exposure to moisture begin to convert to the crystalline form which is not cold-water soluble. Since most agglomeration techniques make use of added moisture, it is understandable that agglomeration of amorphous gelatin-containing products would be avoided.

DESCRIPTION OF THE INVENTION

According to the present invention an amorphous gelatin-containing, dry-blended mix which possess a total moisture content from about 0.8% to less than 5%, preferably from 1 to 3% by weight is slowly heated to a temperature between about 180° to 200° F., preferably about 190° to 197° F. while the mix is being agitated. Upon reaching the aforementioned elevated temperature the mix has achieved an agglomerated state and cooling of the mix is commenced in order to prevent undesirable clumping and/or further clumping of the mix.

The mix will preferably contain at least 20% and typically from 20 to 40% by weight of amorphous gelatin and this gelatin component must be ground to a particle size wherein at least 50% by weight passes through a 230 mesh U.S.S. sieve. Preferably at least 70% by weight of the gelatin will pass through a 230 mesh U.S.S. sieve. The gelatin will have a moisture content of below 8% by weight and preferably below 6% by weight.

The mix will necessarily contain at least 3% and preferably at least 5% by weight of a water-soluble, anhydrous, crystalline food acid. Citric acid, malic acid and combinations thereof would be suitable for use in this invention. The anhydrous food acid must not melt or soften at a temperature below 200° F. The food acid must also be in powdered form such that at least 50% by weight passes through a 200 mesh U.S.S. sieve. The food acid will be present in the mix at a weight level which is less than one-half, preferably less than one-third the level of gelatin.

The mix will also contain at least 30%, preferably at least 50% by weight of a ground material selected from the group consisting of sugars, sugar polymers and combinations thereof. This ground material will be present at a level which is at least 50%, and typically at least about 90%, the weight level of the amorphous gelatin. The particle size of the ground material will be such that at least 50%, preferably at least 65% by weight will pass through a 100 mesh U.S.S. sieve. This ground material will have a moisture content of less than 4%, preferably less than 2% by weight. Sucrose is the preferred sugar and polydextrose is the preferred sugar polymer.

Other functional ingredients may be included in the mix. These materials could include flavor, colors, intensive sweeteners (e.g., saccaharin and aspartame), antifoaming agents and buffer agents. Typically when the mix contains an intensive sweetener, it will be free of sugars and contain a low-caloric bulking agent such as polydextrose. The mix will, however, be essentially free of ingredients which have a melting point at or below 200° F. Conversely when the mix contains a sugar, typically sucrose, it will be free of intensive sweeteners.

The mix will be uniformly blended prior to being heated. This may be done in any suitable equipment known to those skilled in the art. It would, of course, be possible to effect the blending step and the heating step in the same piece of equipment.

As noted previously, the mix is continuously agitated during the heating step. The agglomerated particles that are produced in accordance with this invention are of a relatively uniform size and compositional consistency. The use of a jacketed, closed blender such that a heating or cooling fluid may be passed through the jacket and the blender can be rotated without discharging either blend or agglomerate, is highly suitable. A V-Blender, such as manufactured by Patterson-Kelly Corp. of East Strousburg, Pa., is such a commercially-available blender. Of course, batch or continuous blenders would be suitable for use in this invention.

The agglomerate size is directionaly related to the heating period. The greater the period during which the blend is above 180° F. the larger the agglomerate. It should be recognized that the temperature recited in this description is the temperature of the blend itself and not of the heating or cooling fluid being circulated in the jacketed vessel or of the walls of the vessel.

In operation the cooling of the agglomerated mix should be conducted at a relatively rapid rate such that aggomeration can be brought to a desired end point and then terminated. The agglomerated mix should continue to be agitated during the initial stages of cooling—certainly until the mix is below 185° F. and preferably until the mix is below 160° F. Most preferably the mix is cooled to 120° F. or below while being continuously agitated.

The agglomerated mix resulting from the disclosed process may constitute a complete cold-water soluble gelatin dessert mix product or the mix may constitute an ingredient which is then combined with other materials, such as color, flavor, sugar, etc., to produce a complete cold-water soluble dessert mix product. In either event there can be produced as amorphous gelatin containing agglomerate which dissolves and disperses with simple fork stirring when combined with water as cold as 50° F. and even 40° F. The fact that the gelatin retains an amorphous state through an agglomeration step is a novel and unexpected result of this invention.

Desirably the agglomerated mix is sized by suitable grinding and/or screening procedures to obtain a particle fraction wherein at least 85%, preferably 100% by weight is of minus 30, plus 230 mesh U.S.S. sieve.

This invention is further illustrated but not limited by the following examples wherein all percents are set forth on a percent weight basis and all mesh sizes refer to U.S.S. sieve sizes.

EXAMPLE I

A cold-water soluble and dispersible, gelatin additive for use in a sugar-containing gelatin dessert mix was prepared by first blending the following ingredients:

| Ingredient | (wt. %) | (% H$_2$O) | Particle Size |
|---|---|---|---|
| Amorphous Gelatin | 31 | 6 (max) | 100% thru 230 mesh at least 50% thru 400 mesh |
| Sucrose | 61 | 0.5 (max) | 3% thru 140 mesh 13% on 230 mesh 30% on 400 mesh 54% thru 400 mesh |
| Citric Acid (anhydrous) | 8 | 0.5 (max) | 100% thru 140 mesh 6% on 230 mesh 17% on 400 mesh 77% thru 400 mesh |

Eighteen pounds of this blend which had an overall moisture content of about 1.95% (max) was uniformly mixed and passed to a 1 ft$^3$ jacketed, rotating, batch blender (V-Blender) where the jacket was kept at 100° F. for 10 minutes, 140° F. for about 13.5 minutes, 180° F. for 15 minutes and 205° F. for 20 minutes. The product temperature reached a maximum of about 195° F. at the end of this cycle and the mix had passed from a powdered state to a granular (i.e., agglomerated) state. The contents were then immediately started to be cooled to below 120° F. by sequentially maintaining the jacket for 5 to 10 minute intervals at 180° F., 150°, 120° F. and 90° F. The agglomerated mix was then screened and reworked to obtain a minus 30 mesh plus 230 mesh fraction.

This agglomerated mix was then dry-blended with additional sucrose (ratio of agglomerate to sucrose being 1:2) and color, flavor and antifoam agents and packaged in a moisture-proof pouch. This gelatin dessert mix was found to disperse rapidly without clumping and solubilize in 40° F. water using slow agitating with a fork and the solution set within one hour in a refrigerator to a desirable clear, smooth gelatin dessert texture.

EXAMPLE II

A cold-water soluble and dispersible, sugar-free gelatin dessert mix was prepared by first dry-blending the following ingredients:

| Ingredient | (wt. %) | (% H$_2$O) | Particle Size |
|---|---|---|---|
| Polydextrose (Pfizer, Inc.) | 58.5 | 1.36 (max) | 28% on 100 mesh 37.5% on 230 mesh 35.3% on 400 mesh 0.4% thru 400 mesh |
| Amorphous | 29.5 | 6 (max) | (see Example I) |

-continued

| Ingredient | (wt. %) | (% H₂O) | Particle Size |
|---|---|---|---|
| gelatin | | | |
| Citric Acid (anhydrous) | 7.5 | 0.5 (max) | (see Example I) |
| Salt | 1.5 | 0 | <5% on 30 mesh <11% thru 70 mesh |
| Aspartame | 1.1 | 4.5 (max) | >95% through 100 mesh |
| Flavor & Color | 1.8 | 6 (max) | — |
| Antifoam | <0.1 | 0 | — |

Eighteen pounds of this blend which has an overall moisture content of 2.75% (max) was uniformly mixed and passed to a 1 ft³ jacketed rotating V-Blender where the jacket was kept at 100° F. for 10 minutes, 140° F. for about 13.5 minutes, 180° F. for 15 minutes, 195° F. for 10 minutes after which the blender was quickly stopped, opened and the internal surface scraped of adhered material. Mixing and heating was then continued for 15 minutes at a jacket temperature of 205° F. at which point the product had reached a temperature of 195° F. and achieved an agglomerated state. The contents were then immediately started to be cooled to below 120° F. as in Example I. The agglomerated dessert mix was then screened and packaged as in Example I. This sugar-free product possessed the same functionality described for the dessert mix of Example I.

Having thus described the invention what is claimed is:

1. A process for agglomerating an amorphous gelatin-containing mix which is readily soluble and dispersible in water at 50° F. in the absence of added moisture comprising the steps of:
   (a) preparing a mix containing (i) at least 20% by weight amorphous gelatin, said gelatin having a particle size wherein at least 50% by weight passes through a 230 mesh U.S.S. sieve, (ii) at least 3% by weight of a powdered, water-soluble, anhydrous, crystalline food acid, said food acid being less than one-half by weight of the gelatin and having a particle size wherein at least 50% by weight of the acid passes through a 200 mesh U.S.S. sieve, and (iii) at least 30% by weight of a ground material selected from the group consisting of sugar, sugar polymers and combinations thereof, said ground material being present at a level which is at least 50% the weight of gelatin and having a particle size wherein at least 50% by weight passes through a 100 mesh U.S.S. sieve and wherein said mix has a total moisture content of from 0.8% to less than 5% by weight of the mix and said mix is essentially free of ingredients which have a melting point at or below 200° F.;
   (b) continuously agitating the mix while raising the temperature of the agitated mix to between about 180° to 200° F. said temperature being sufficient to effect agglomeration of the mix;
   (c) promptly cooling the agglomerated mix to below about 120° F. while continuing to agitate the mix at least during the initial stages of cooling;
   (d) sizing the agglomerated mix to obtain a desired particle size fraction by weight; and
   (e) packaging the agglomerated, sized mix in moisture-proof packaging material.

2. The product produced by the process of claim 1.

3. The process of claim 1 wherein the agglomerated mix is soluble and dispersible in water at 40° F. with fork stirring.

4. The process of claim 1 wherein the moisture content of the mix is from 1 to 3% by weight.

5. The process of claim 1 wherein the amorphous gelatin is present at a level of from 20 to 40% by weight and has a particle size distribution wherein at least 70% by weight will pass through a 230 mesh U.S.S. sieve.

6. The process of claim 1 wherein the food acid is selected from the group consisting of citric acid, malic acid, tartaric acid and combinations thereof.

7. The process of claim 1 wherein the mix consists essentially of amorphous gelatin; anhydrous food acid and sugar or sugar polymers having a moisture content of less than 4% by weight.

8. The process of claim 1 wherein the sugar is sucrose.

* * * * *